United States Patent
Jiang et al.

(10) Patent No.: US 10,767,626 B2
(45) Date of Patent: Sep. 8, 2020

(54) COMPUTER PROGRAM PRODUCT, METHOD AND APPARATUS FOR YAW CONTROL OF WIND TURBINE GENERATOR SYSTEM

(71) Applicant: BEIJING GOLDWIND SCIENCE & CREATION WINDPOWER EQUIPMENT CO., LTD., Beijing (CN)

(72) Inventors: Yongqiang Jiang, Beijing (CN); Zhiqiang Qiao, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 285 days.

(21) Appl. No.: 15/575,103

(22) PCT Filed: Nov. 10, 2016

(86) PCT No.: PCT/CN2016/105314
§ 371 (c)(1),
(2) Date: Nov. 17, 2017

(87) PCT Pub. No.: WO2017/107693
PCT Pub. Date: Jun. 29, 2017

(65) Prior Publication Data
US 2018/0149136 A1    May 31, 2018

(30) Foreign Application Priority Data
Dec. 24, 2015   (CN) .......................... 2015 1 0993249

(51) Int. Cl.
*F03D 7/02*    (2006.01)
*F03D 17/00*   (2016.01)

(52) U.S. Cl.
CPC ............ *F03D 7/0204* (2013.01); *F03D 17/00* (2016.05); *F05B 2270/32* (2013.01); *F05B 2270/321* (2013.01); *Y02E 10/723* (2013.01)

(58) Field of Classification Search
CPC .... F03D 7/0204; F03D 17/00; F05D 2270/32; F05D 2270/321; Y02E 10/723
See application file for complete search history.

(56) References Cited

U.S. PATENT DOCUMENTS

| | | |
|---|---|---|
| 2011/0140420 A1 | 6/2011 | Loh et al. |
| 2012/0027589 A1 | 2/2012 | Haag et al. |

(Continued)

FOREIGN PATENT DOCUMENTS

| | | |
|---|---|---|
| CN | 101389967 A | 3/2009 |
| CN | 102168651 A | 8/2011 |

(Continued)

OTHER PUBLICATIONS

International Search Report dated Jan. 26, 2017; PCT/CN2016/105314.

(Continued)

*Primary Examiner* — Richard A Edgar (57) ABSTRACT

The present application discloses a computer program product, a method and an apparatus for yaw control of wind turbine generator system. The method for yaw control of wind turbine generator system includes: obtaining a real-time parameter of wind condition according to a predetermined length of time; performing vector analysis of the obtained parameter of wind condition to obtain a direction angle of prime wind energy; controlling yaw of the wind turbine generator system according to the direction angle of the prime wind energy. The employment of the computer program product, the method and apparatus for yaw control of wind turbine generator system provides relatively accurate data to the wind turbine generator system, improves the (Continued)

accuracy of the yaw of the generator system, thereby increasing the utilization rate of the wind energy.

14 Claims, 6 Drawing Sheets

(56) References Cited

U.S. PATENT DOCUMENTS

2012/0242085 A1* 9/2012 Garfinkel .............. F03D 7/0204
290/44
2015/0086357 A1 3/2015 Gregg

FOREIGN PATENT DOCUMENTS

| CN | 104114859 A | 10/2014 |
|----|----|----|
| CN | 104321527 A | 1/2015 |
| CN | 104373293 A | 2/2015 |
| CN | 104632521 A | 5/2015 |
| CN | 105484938 A | 4/2016 |
| EP | 1460266 A2 | 9/2004 |
| EP | 1460266 A3 | 10/2010 |
| JP | 2004301116 A | 10/2004 |
| KR | 20090083371 A | 8/2009 |
| WO | 2012/153185 A1 | 11/2012 |

OTHER PUBLICATIONS

Australian Examination Report No. 2; dated May 27, 2019; Appln. No. 2016377432.
Korean Office Action dated Apr. 19, 2019; Appln. No. 10-20-17-7037470.
Peter J M Clive; "Lidar and resource assessment for wind power applications: the state of the art", Proceedings vol. 7111, Lidar Technologies, Techniques, and Measurements for Atmospheric Remote Sensing IV; 711107 Oct. 15, 2008; https://doi.org/10.1117/12/800284; Event: SPIE Remote Sensing, 2008, Cardiff, Wales, United Kingdom. 10 pages.
The Extended European Search Report dated Nov. 20, 2018; Appln. No. 16877504.7.
Korean Notice of Rejection dated Oct. 15, 2019; Appln. No. 10-2017-7037470.

* cited by examiner

COMPUTER PROGRAM PRODUCT, METHOD AND APPARATUS FOR YAW CONTROL OF WIND TURBINE GENERATOR SYSTEM

CROSS-REFERENCE TO RELATED APPLICATIONS

This application is a national stage of International Application No. PCT/CN2016/105314, filed on Nov. 10, 2016, which claims priority to Chinese Patent Application No. 201510993249.1, filed with the Chinese Intellectual Property Office on Dec. 24, 2015 and entitled "METHOD AND APPARATUS FOR YAW CONTROL OF WIND TURBINE GENERATOR SYSTEM". The disclosure of the above patent application is incorporated herein by reference in its entirety.

TECHNICAL FIELD

The present application relates to the field of wind energy technology, and more particularly, to a computer program product, a method and an apparatus for yaw control of wind turbine generator system.

BACKGROUND

A yaw control system, which is an important component of wind turbine generator system (hereinafter referred to as generator system), is used to control the position of a generator system relative to wind to face the wind on the front side, to increase absorption efficiency of wind energy and to effectively reduce asymmetrical loads due to impellers not directly facing the wind. The goal of a yaw control system is to keep generator system operating in a wind direction range with high absorption efficiency of wind energy as much as possible.

However, the yaw control, is susceptible to the effect of wind shear, resulting in a lower reference accuracy provided for the yaw of the wind turbine generator system, which reduces the accuracy of yaw of the generator system, and hinders the improvement in the utilization rate of the wind energy.

SUMMARY

A first aspect of the present application provides a method for yaw control of wind turbine generator system, which includes: obtaining a real-time parameter of wind condition according to a predetermined length of time; performing vector analysis of the obtained parameter of wind condition to obtain a direction angle of prime wind energy during the predetermined length of time; and controlling yaw of the wind turbine generator system according to the direction angle of the prime wind energy.

A second aspect of the present application provides an apparatus for yaw control of wind turbine generator system, which includes: a parameter acquiring module, configured to obtain a real-time parameter of wind condition according to a predetermined length of time; a direction angle generating module, configured to perform vector analysis of the obtained parameter of wind condition to obtain a direction angle of the prime wind energy during the predetermined length of time; and a yaw control module, configured to control yaw of the wind turbine generator system according to the direction angle of the prime wind energy.

2

A third aspect of the present application provides an apparatus for yaw control of wind turbine generator system, which includes: an acquiring device configured to obtain a real-time parameter of wind condition according to a predetermined length of time; a processor, configured to perform vector analysis of the obtained parameter of wind condition to obtain a direction angle of the prime wind energy during the predetermined length of time; and a controller, configured to control yaw of the wind turbine generator system according to the direction angle of the prime wind energy.

A fourth aspect of the present application provides a computer storage medium, which stores computer programs when executed by a computer processor causing the computer processor to execute the said method for yaw control.

A fifth aspect of the present application provides a computer program product, which includes a computer program, that is readable by computer storage medium, and causes a computer to perform the said method for yaw control.

DESCRIPTION OF EMBODIMENTS

Some implementations of the present application will be described in detail in the following, in combination with the accompanying drawings. The following embodiments and features of the following embodiments may be mutually combined under the condition of no conflict.

Figure 1:
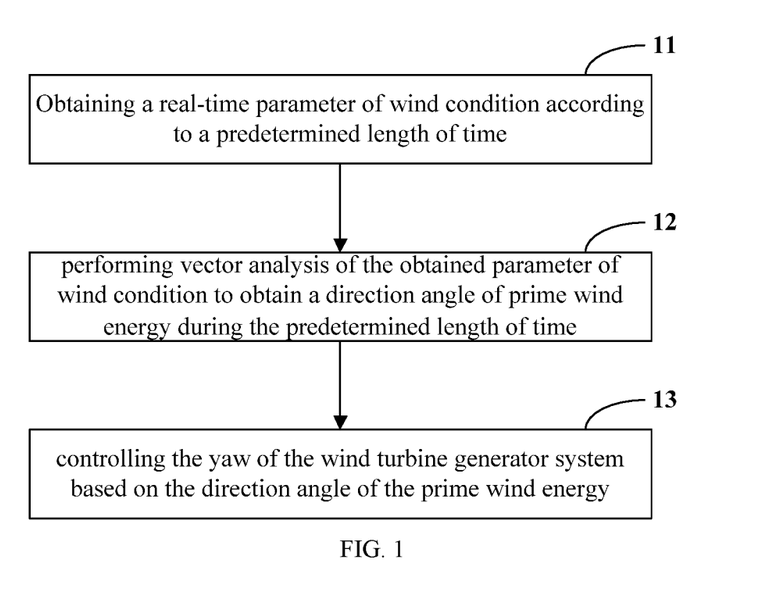
FIG. 1 is a schematic flowchart of a method for yaw control of wind turbine generator system according to embodiments of the present application.

FIG. 1 is a schematic flowchart of a method for yaw control of wind turbine generator system according to embodiments of the present application, as shown in FIG. 1, the method for yaw control of the wind turbine generator system includes:

Step 11: obtaining a real-time parameter of wind condition according to a predetermined length of time.

In some embodiments, the parameter of wind condition may include a wind direction angle and a wind velocity. The Parameter of wind condition may be measured and stored by wind measurement devices in real time, such as wind direction angle θi at moment tj and a corresponding wind velocity vij.

Where, the wind measurement devices include, but not limited to, anemometer and anemoscope. In practical applications, the employment of the anemometer and anemoscope can reduce the cost of the yaw control of the wind turbine generator system. In addition to the anemometer and anemoscope, other devices capable of obtaining parameter of wind condition like a laser radar or an ultrasound may also be employed to perform data measurement.

Step 12: performing vector analysis of the obtained parameter of wind condition to obtain an direction angle of prime wind energy during the predetermined length of time.

Following the obtainment of the said parameter of wind condition, such as the wind direction angle θi at time tj and the corresponding wind velocity vij, the vector analysis is performed according to the direction angle and wind velocity at each moment from 0s to tj, to calculate direction angle of prime wind energy.

Step 13: controlling the yaw of the wind turbine generator system based on the direction angle of the prime wind energy.

According to an exemplary embodiment of the present application, step 13 includes: obtaining an azimuth angle of a cabin of the wind turbine generator system at present time; calculating a differential value between the direction angle of the prime wind energy and the azimuth angle of the cabin; controlling the yaw of the wind turbine generator system based on the differential value between the direction angle of the prime wind energy and the azimuth angle of the cabin.

Following the obtainment of the differential value between the direction angle of the prime wind energy and the azimuth angle of the cabin, the differential value may be used for determination to control the yaw system to employ corresponding yaw operations. Specific determination methods and operations carrying out yaw are not limited in present embodiment.

In some embodiments, the present embodiment provides an implementation of controlling the yaw of the wind turbine generator system based on the differential value between the direction angle of the prime wind energy and the azimuth angle of the cabin, as follows: looking up a yaw deviation threshold corresponding with current wind velocity in a preset schedule table of yaw deviation threshold gain, wherein yaw deviation thresholds obtained from simulations and practical experience of controlling the yaw to determine the schedule of yaw are stored in the said schedule table of yaw deviation threshold gain. If the said differential value between the direction angle of the prime wind energy and the azimuth angle of the cabin is greater than the found yaw deviation threshold, determine an indication to the generator system to trigger yaw operations. The generator system may accomplish yaw based on a procedure of yaw operations.

The method for yaw control of the wind turbine generator system of the present application further performs vector analysis of the obtained parameter of wind condition to determine a direction angle of the prime wind energy, by obtaining parameter of wind condition under circumstances of the wind turbine generator system during a predetermined length of time in real time, such that relatively accurate data is provided for the wind turbine generator system, and the accuracy of the yaw of the generator system is improved, thereby increasing the utilization rate of wind energy.

Figure 2:
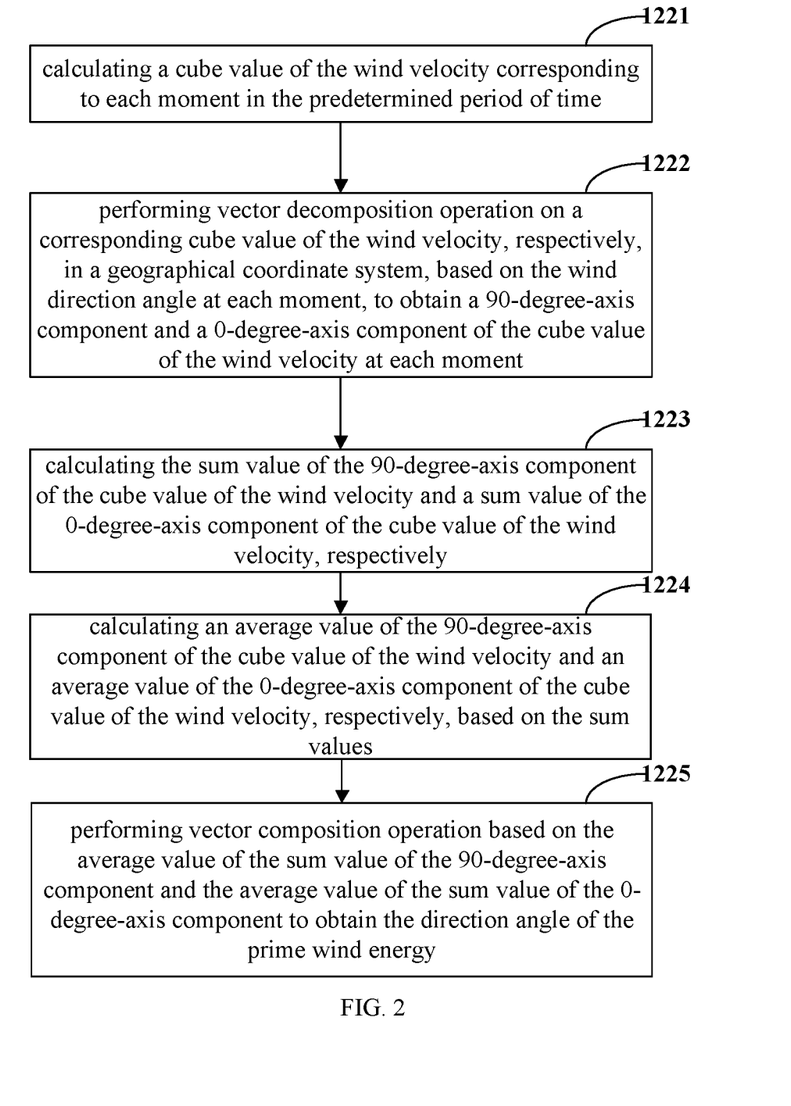
FIG. 2 is a schematic flowchart of step 12 of the method for yaw control of the wind turbine generator system according to embodiments of the present application.

FIG. 2 is a schematic flowchart of step 12 of the method for yaw control of wind turbine generator system according to embodiments of the present application. Referring to FIG. 2, according to an exemplary embodiment of the present application, step 12 may include:

Step 1221: calculating a cube value of the wind velocity corresponding to each moment in the predetermined period of time.

Figure 3:
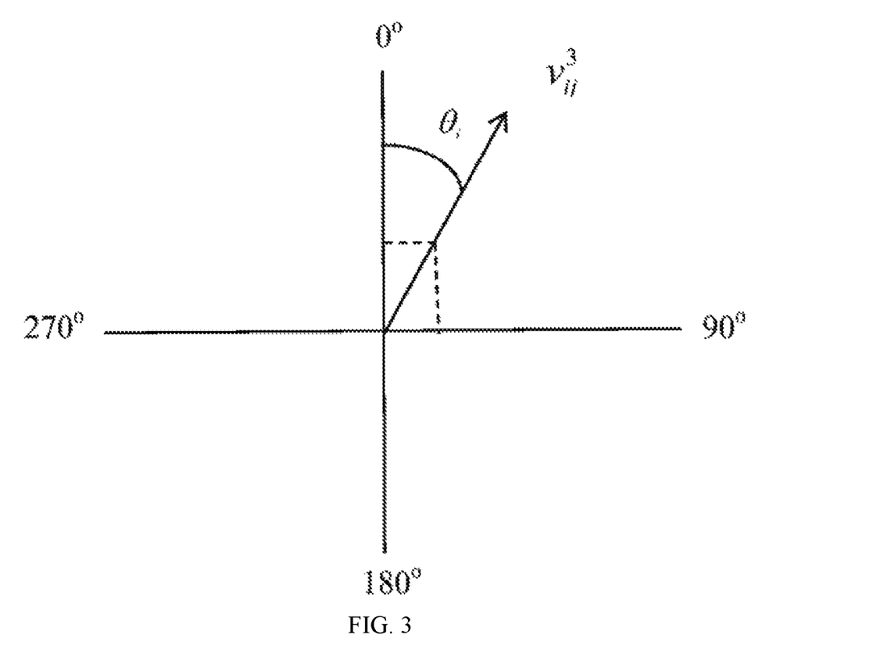
FIG. 3 is an exemplary diagram of vector decomposition operation of the method for yaw control of the wind turbine generator system according to embodiments of the present application.

Step 1222: performing vector decomposition operation on a corresponding cube value of the wind velocity, respectively, in a geographical coordinate system, based on the wind direction angle at each moment, to obtain a 90-degree-axis component and a 0-degree-axis component of the cube value of the wind velocity at each moment. In some embodiments, perform vector decomposition operation of vij3 in a geographical coordinate system. FIG. 3 is an exemplary diagram of vector decomposition operation of the method for yaw control of the wind turbine generator system according to embodiments of the present application. Referring to FIG. 3, assume the direction of 0 degree is the positive x-direction, and the opposite thereof is the negative x-direction; the direction of 90 degrees is the positive y-direction, and the opposite thereof is the negative y-direction, use the following equation (1) and equation (2) to perform decomposition operation of all parameter of wind condition during the said period of time:

$$x = v_{ij}^3 \cos\theta_i \quad (1)$$

$$y = v_{ij}^3 \sin\theta_i \quad (2)$$

Step 1223: calculating the sum value of the 90-degree-axis component of the cube value of the wind velocity and a sum value of the 0-degree-axis component of the cube value of the wind velocity, respectively.

In some embodiments, in the condition that data collecting frequency is h, of which the unit is hertz, the total amount of data collected during the foregoing period of time is:

$$N = h * t_j \quad (3)$$

After decomposing the parameter of wind condition during the period of time from 0s to tj into the coordinate axes shown in FIG. 2, calculate the sum value of the component of each axis by using the following equation (4) and equation (5):

$$x_j = \sum_{t=0}^{t=t_j} v_{ij}^3 \cos\theta_i \quad (4)$$

$$y_j = \sum_{t=0}^{t=t_j} v_{ij}^3 \sin\theta_i \quad (5)$$

Step 1224: calculating an average value of the 90-degree-axis component of the cube value of the wind velocity and an average value of the 0-degree-axis component of the cube value of the wind velocity, respectively, based on the sum values.

In some embodiments, use the following equation (6) and equation (7) to calculate an average value of the sum value of the component of each axis:

$$\bar{x}_j = \frac{x_j}{N} \quad (6)$$

-continued $$\overline{y}_j = \frac{y_j}{N} \quad (7)$$

Step 1225: performing vector composition operation based on the average value of the sum value of the 90-degree-axis component and the average value of the sum value of the 0-degree-axis component to obtain the direction angle of the prime wind energy.

Figure 4:
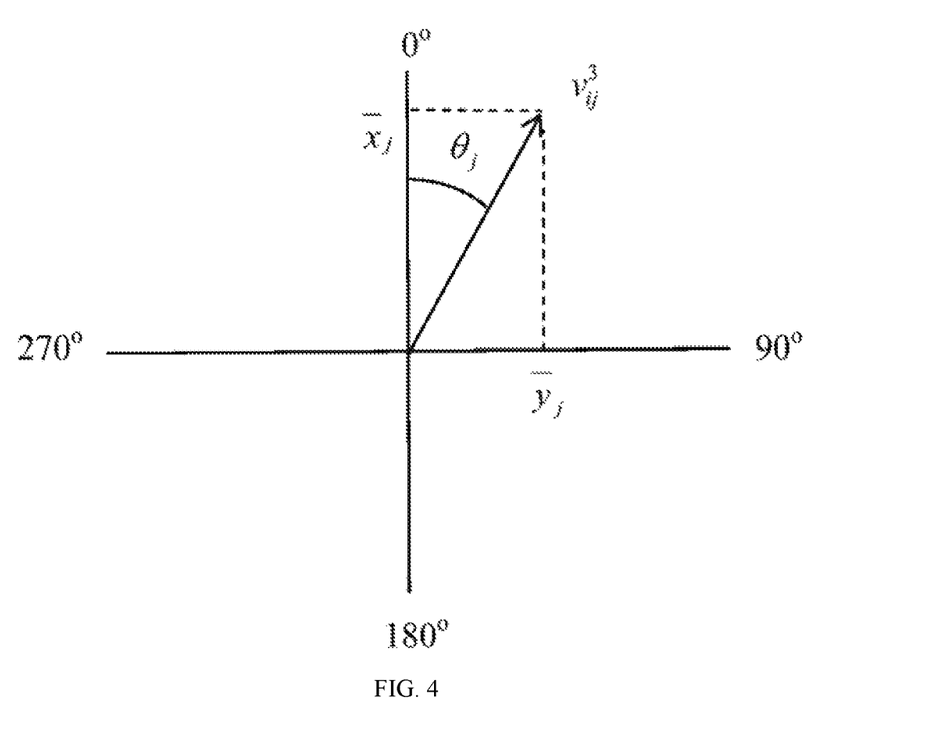
FIG. 4 is an exemplary diagram of vector composition operation of the method for yaw control of the wind turbine generator system according to embodiments of the present application.

FIG. 4 is an exemplary diagram of vector composition operation of the method for yaw control of the wind turbine generator system according to embodiments of the present application. Referring to FIG. 4, perform vector composition operation on an average value of the foregoing two sum values of the axis components to obtain the composite vector vij3, and then obtain θj, the corresponding angle of vij3, by calculating, wherein the angle θ j may be obtained by using the following equation (8):

$$\theta_j = \arctan \frac{\overline{y}_j}{\overline{x}_j} \quad (8)$$

At last, from the characteristics of vector composition operation, the composite vector vij3 is the direction with the highest wind energy, i.e. the direction angle of the prime wind energy θ j is obtained, and the following equation (9) is configured to perform arithmetic operation on the obtained direction angle of the prime wind energy and the current azimuth angle of the cabin:

$$\Delta\theta = \theta_j - \theta \quad (9)$$

Hence, the angle difference Δθ provides the basis for yaw which can be configured to carry out yaw operations to achieve the purpose of accurately facing the wind and eventually improve the utilization rate of wind energy.

Other than performing vector decomposition on the cube value of wind velocity at first as described above, alternatively, it is performing vector decomposition to the velocity firstly, then performing cube and average operation and finally obtaining the direction angle through vector composition; or performing vector decomposition to the velocity firstly, then calculating the sum value of component of each axis, after that, calculating the average value and then performing cube operation, finally obtaining direction angle by performing vector composition operation.

Figure 5:
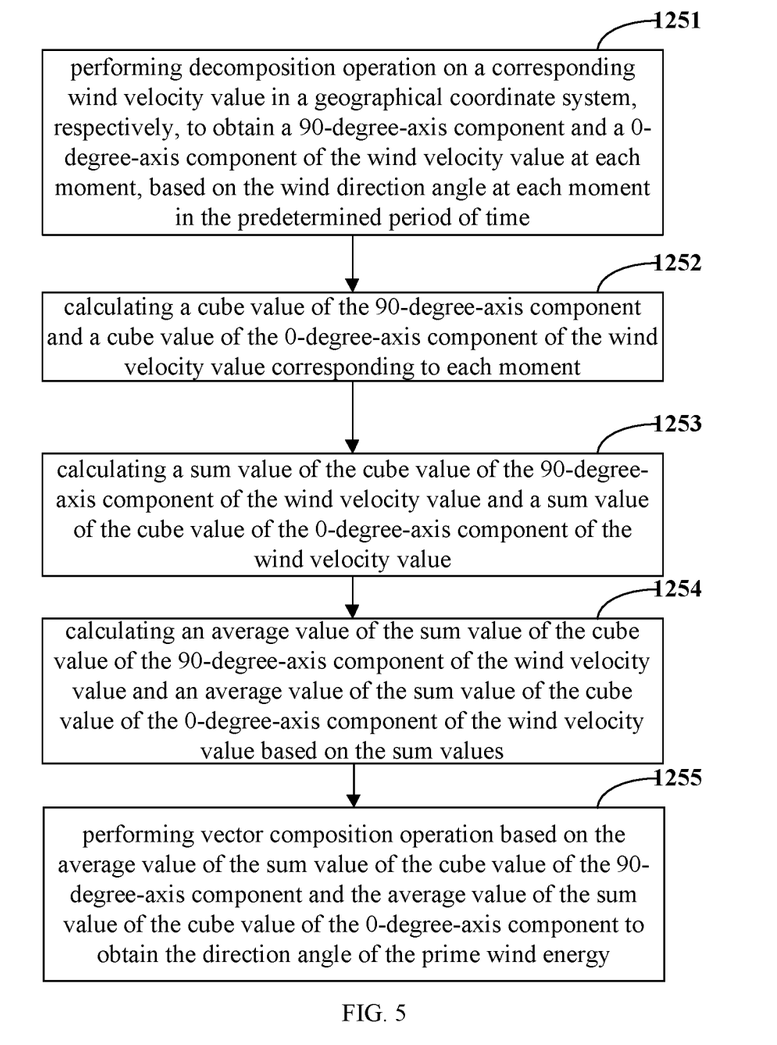
FIG. 5 is another schematic flowchart of step 12 of the method for yaw control of wind turbine generator system according to embodiments of the present application.

Accordingly, FIG. 5 is another schematic flowchart of step 12 of the method for yaw control of the wind turbine generator system according to embodiments of the present application. Referring to FIG. 5, in accordance with another exemplary embodiment of the present application, step 12 may include:

Step 1251: performing decomposition operation on a corresponding wind velocity value in a geographical coordinate system, respectively, to obtain a 90-degree-axis component and a 0-degree-axis component of the wind velocity value at each moment, based on the wind direction angle at each moment in the predetermined period of time;

Step 1252: calculating a cube value of the 90-degree-axis component and a cube value of the 0-degree-axis component of the wind velocity value corresponding to each moment;

Step 1253: calculating a sum value of the cube value of the 90-degree-axis component of the wind velocity value and a sum value of the cube value of the 0-degree-axis component of the wind velocity value;

Step 1254: calculating an average value of the sum value of the cube value of the 90-degree-axis component of the wind velocity value and an average value of the sum value of the cube value of the 0-degree-axis component of the wind velocity value based on the sum values; and Step 1255: performing vector composition operation based on the average value of the sum value of the cube value of the 90-degree-axis component and the average value of the sum value of the cube value of the 0-degree-axis component to obtain the direction angle of the prime wind energy.

Figure 6:
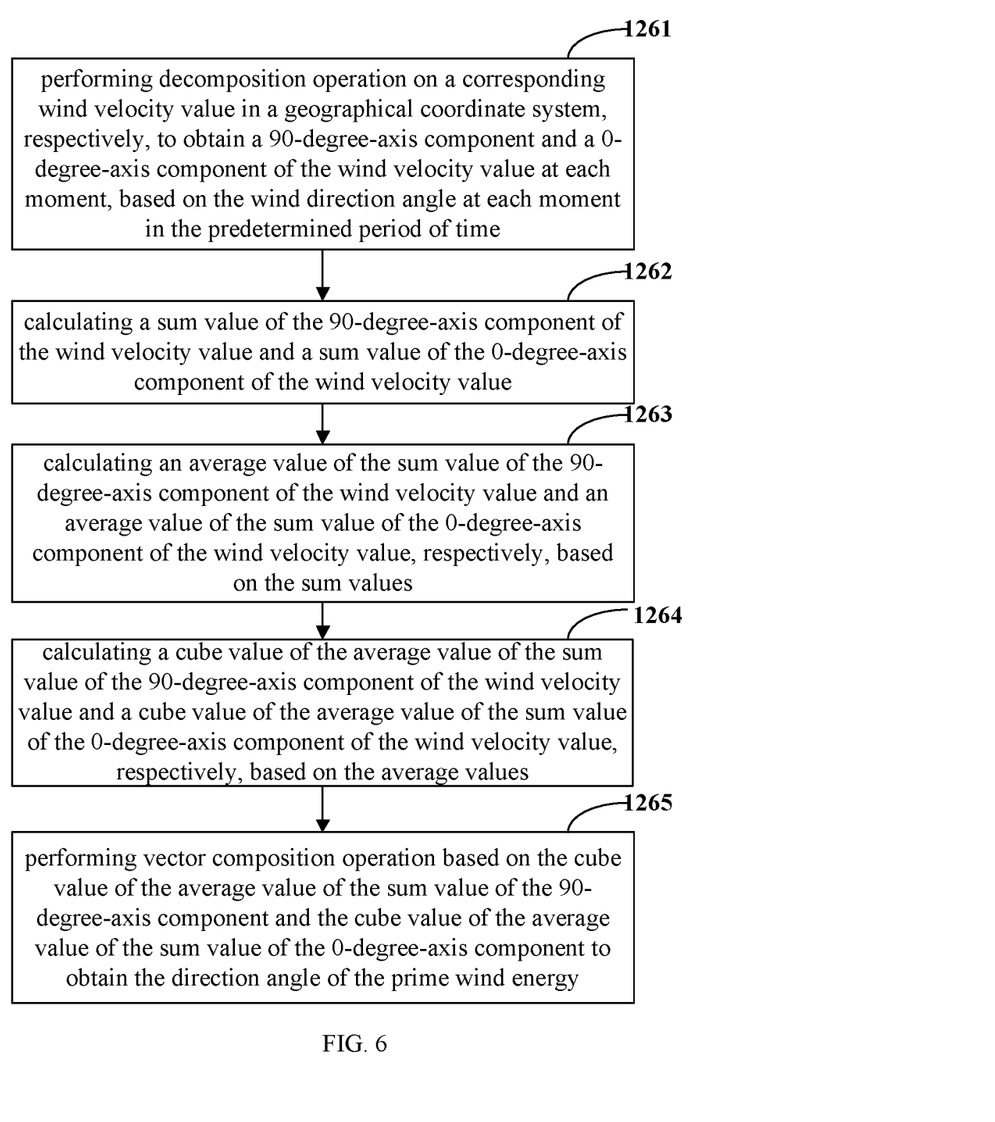
FIG. 6 is yet another schematic flowchart of step 12 of the method for yaw control of the wind turbine generator system according to embodiments of the present application.

FIG. 6 is yet another schematic flowchart of step 12 of the method for yaw control of the wind turbine generator system according to embodiments of the present application. Referring the FIG. 6, in accordance with another exemplary embodiment of the present application, step 12 may include:

Step 1261: performing decomposition operation on a corresponding wind velocity value in a geographical coordinate system, respectively, to obtain a 90-degree-axis component and a 0-degree-axis component of the wind velocity value at each moment, based on the wind direction angle at each moment in the predetermined period of time;

Step 1262: calculating a sum value of the 90-degree-axis component of the wind velocity value and a sum value of the 0-degree-axis component of the wind velocity value;

Step 1263: calculating an average value of the sum value of the 90-degree-axis component of the wind velocity value and an average value of the sum value of the 0-degree-axis component of the wind velocity value, respectively, based on the sum values;

Step 1264: calculating a cube value of the average value of the sum value of the 90-degree-axis component of the wind velocity value and a cube value of the average value of the sum value of the 0-degree-axis component of the wind velocity value, respectively, based on the average values; and Step 1265: performing vector composition operation based on the cube value of the average value of the sum value of the 90-degree-axis component and the cube value of the average value of the sum value of the 0-degree-axis component to obtain the direction angle of the prime wind energy.

It is obvious that the sequence of the steps of performing vector decomposition, calculating cube value, calculating sum value and calculating average value may be different. Specific calculation formula of each step is described in details in FIG. 2. The sequences of the steps have been adjusted to adapt to various calculating needs in FIG. 5 and FIG. 6. The calculation formula may be referred to relative description in terms of FIG. 2, which will not be repeated herein. In practical applications, one of these three exemplary procedures of data processing described above may be selected based on field conditions. Besides, the parameter of wind condition may also be collected by using existing velocity vector operation wind measurement devices; and then data processing and analysis are performed by employing the concept according to embodiments of the present application; eventually the basis for yaw is provided.

Based on the embodiments described above, the following technical effects may also be attained: in one aspect, from the principle of vector composition operation, the influence of instant airflow disturbance is filtered out effectively to achieve the purpose of accurately facing the wind; in another aspect, the stability of airflow characteristics test is improved by properly selecting periods of time for data collection and performing average value operation, and therefore errors is reduced; in a further aspect, embodiments of the present application are simple, practical and easy to be applied without increasing equipment cost.

Figure 7:
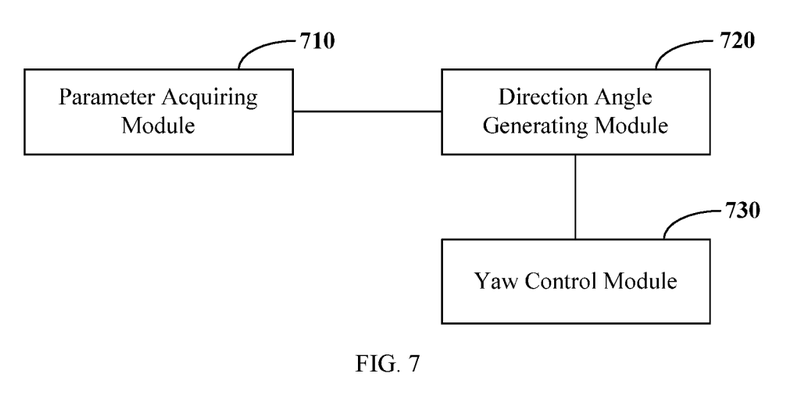
FIG. 7 is a schematic diagram of an apparatus for yaw control of the wind turbine generator system according to embodiments of the present application.

FIG. 7 is a schematic diagram of an apparatus for yaw control of the wind turbine generator system according to embodiments of the present application, which may be configured to implement steps of the method for yaw control of the wind turbine generator system according to embodiments of the present application.

Referring to FIG. 7, an apparatus for yaw control of the wind turbine generator system includes a parameter acquiring module 710, a direction angle generating module 720 and a yaw control module 730.

The parameter acquiring module 710 is configured to obtain real-time parameter of wind condition according to a predetermined length of time.

Herein, the parameter of wind condition include a wind direction angle and a wind velocity.

The direction angle generating module 720 is configured to perform vector analysis of the obtained parameter of wind condition to obtain a direction angle of the prime wind energy during the predetermined length of time.

According to an embodiment of the present application, the direction angle generating module 720 may include:

a cube calculation unit (not shown in the FIG), configured to calculate a cube value of the wind velocity corresponding to each moment in the predetermined period of time;

a vector decomposition unit (not shown in the FIG), configured to perform vector decomposition operation on a corresponding cube value of the wind velocity, respectively, in a geographical coordinate system, based on the wind direction angle at each moment, to obtain a 90-degree-axis component and a 0-degree-axis component of the cube value of the wind velocity at each moment;

a sum calculation unit (not shown in the FIG), configured to calculate a sum value of the 90-degree-axis component of the cube value of the wind velocity and a sum value of the 0-degree-axis component of the cube value of the wind velocity, respectively;

an average calculation unit (not shown in the FIG), configured to calculate an average value of the 90-degree-axis component of the cube value of the wind velocity and an average value of the 0-degree-axis component of the cube value of the wind velocity, respectively, based on the sum values; and a vector composition unit (not shown in the FIG), configured to perform vector composition operation based on the average value of the sum value of the 90-degree-axis component and the average value of the sum value of the 0-degree-axis component to obtain the direction angle of the prime wind energy.

The yaw control module 730 is configured to control yaw of the wind turbine generator system according to the direction angle of the prime wind energy.

Specifically, the yaw control module 730 may include:

an azimuth angle obtaining unit (not shown in the FIG), configured to obtain an azimuth angle of a cabin of the wind turbine generator system at present time;

a differential value calculation unit (not shown in the FIG), configured to calculate a differential value between the direction angle of prime wind energy and the azimuth angle of the cabin;

a yaw control unit (not shown in the FIG), configured to control the yaw of the wind turbine generator system based on the differential value.

An apparatus for yaw control of the wind turbine generator system of the present application obtains parameter of wind condition under circumstances of the wind turbine generator system during a predetermined length of time in real time, further performs vector analysis of the obtained parameter of wind condition to determine a direction angle of the prime wind energy, such that relatively accurate data for the wind turbine generator system is provided, and the accuracy of the yaw of the generator system, thereby increasing the utilization rate of wind energy.

Figure 8:
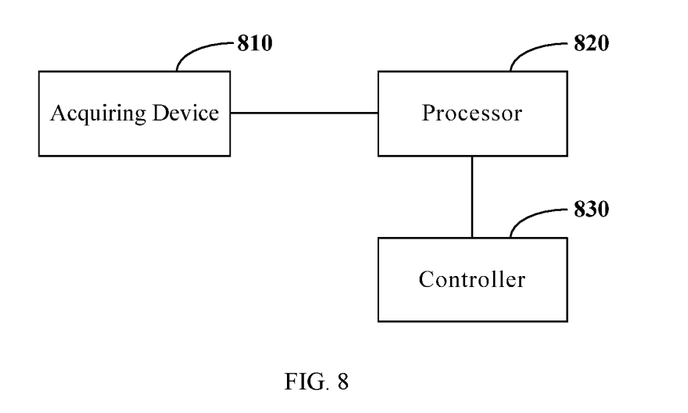
FIG. 8 is a schematic diagram of an apparatus for yaw control of the wind turbine generator system according to embodiments of the present application.

FIG. 8 is a schematic diagram of an apparatus for yaw control of the wind turbine generator system according to embodiments of the present application, which may be configured to implement steps of the method for yaw control of the wind turbine generator system according to embodiments of the present application.

Referring to FIG. 8, an apparatus for yaw control of the wind turbine generator system includes an acquiring device 810, a processor 820 and a controller 830.

The acquiring device 810 is configured to obtain real-time parameter of wind condition according to a predetermined length of time.

It should be noted that the acquiring device may be, but not limited to, a wind measurement sensor, an anemometer and anemoscope, or other receiving apparatuses for receiving wind condition. Herein, the receiving apparatus for receiving wind condition receives data of wind condition measured by the wind measurement sensor or the anemometer and anemoscope after parameter of wind condition have been measured by the wind measurement sensor or the anemometer and anemoscope.

The processor 820 is configured to perform vector analysis of the obtained parameter of wind condition to obtain a direction angle of the prime wind energy during the predetermined length of time.

The controller 830 is configured to control yaw of the wind turbine generator system according to the direction angle of the prime wind energy.

In other words, the processor 820 of the apparatus for yaw control analyzes and calculates the direction angle of the prime wind energy according to the obtained parameter of wind condition, and eventually controls the yaw of the wind turbine generator system by the apparatus for yaw control itself according to the direction angle of wind energy. In specific implementations, the apparatus for yaw control of the wind turbine generator system may also be an apparatus independent from the central control system of the wind turbine generator system. Specifically, the apparatus for yaw control of the wind turbine generator system obtains parameter of wind condition and performs vector analysis of the parameter of wind condition to obtain a direction angle of the prime wind energy, sends the final direction angle of the prime wind energy to the central control system of the wind turbine generator system which then sends a yaw instructions to implement corresponding yaw operations.

Embodiments of the present application further provides a computer storage medium and/or a computer program product, where the computer storage medium stores a computer program, the computer program product includes a computer program readable by a computer storage medium, and the computer programs causes a computer to perform the method for yaw control described in FIG. 1 or FIG. 2.

Those skilled in the art should understand that embodiments of the present application may be provided as a method, an apparatus, computer storage medium or a computer program product. Therefore, the present application may take a form of a hardware embodiment, a software embodiment or an embodiment combining software and hardware aspects. Furthermore, the present application may take the form of a computer program product implemented by one or more computer usable storage medium which contains computer usable program code (including but not limited to disc storage, optical storage, and etc.).

These computer programs may also be loaded into a computer or other programmable data processing devices to enable a series of operation steps to be executed on a computer or other programmable devices, to generate a computer-implemented process, thus instructions executed by a computer or other programmable devices provide steps for implementing specified functions in one or more flows of a flowchart and/or one or more blocks of a block diagram.

Finally, it should be noted that the above embodiments are merely for illustrating the technical schemes of the present application, but not for limiting therefor; although detailed description has been made referring to the foregoing embodiments, those skilled in the art should understand that various modifications may be made to the technical schemes according to the foregoing embodiments, or equivalents may be substituted for part or all of the technical aspects; while such modifications or substitutions do not deviate the nature of the technical solutions from the scope of the technical solutions embodied in the embodiments according to the present application.

What is claimed is:

1. A method for yaw control of a wind turbine generator system, comprising:
    obtaining, by the wind turbine generator system, a real-time parameter of wind condition according to a predetermined length of time, wherein the parameter of wind condition comprises a wind direction angle and a wind velocity;
    performing, by the wind turbine generator system, vector analysis of the obtained parameter of wind condition to obtain a direction angle of prime wind energy during the predetermined length of time, wherein the direction angle of the prime wind energy is direction with the highest wind energy, and is obtained by performing vector analysis on a cube value of the wind velocity during the predetermined length of time; and
    controlling, by the wind turbine generator system, yaw of the wind turbine generator system according to the direction angle of the prime wind energy.

2. The method according to claim 1, wherein the performing, by the wind turbine generator system, vector analysis of the obtained parameter of wind condition to obtain the direction angle of the prime wind energy during the predetermined length of time comprises:
    calculating, by the wind turbine generator system, a cube value of the wind velocity corresponding to each moment in the predetermined period of time;
    performing, by the wind turbine generator system, vector decomposition operation on a corresponding cube value of the wind velocity, respectively, in a geographical coordinate system, based on the wind direction angle at each moment, to obtain a 90-degree-axis component and a 0-degree-axis component of the cube value of the wind velocity at each moment; calculating a sum value of the 90-degree-axis component of the cube value of the wind velocity and a sum value of the 0-degree-axis component of the cube value of the wind velocity, respectively;
    calculating, by the wind turbine generator system, an average value of the 90-degree-axis component of the cube value of the wind velocity and an average value of the 0-degree-axis component of the cube value of the wind velocity, respectively, based on the sum values; and
    performing, by the wind turbine generator system, vector composition operation based on the average value of the sum value of the 90-degree-axis component and the average value of the sum value of the 0-degree-axis component to obtain the direction angle of the prime wind energy.

3. The method according to claim 1, wherein the performing, by the wind turbine generator system, vector analysis of the obtained parameter of wind condition to obtain the direction angle of the prime wind energy during the predetermined length of time comprises:
    performing, by the wind turbine generator system, decomposition operation on a corresponding wind velocity value in a geographical coordinate system, respectively, to obtain a 90-degree-axis component and a 0-degree-axis component of the wind velocity value at each moment, based on the wind direction angle at each moment in the predetermined period of time;
    calculating, by the wind turbine generator system, a cube value of the 90-degree-axis component and a cube value of the 0-degree-axis component of the wind velocity value corresponding to each moment;
    calculating, by the wind turbine generator system, a sum value of the cube value of the 90-degree-axis component of the wind velocity value and a sum value of the cube value of the 0-degree-axis component of the wind velocity value;
    calculating, by the wind turbine generator system, an average value of the sum value of the cube value of the 90-degree-axis component of the wind velocity value and an average value of the sum value of the cube value of the 0-degree-axis component of the wind velocity value based on the sum values; and
    performing, by the wind turbine generator system, vector composition operation based on the average value of the sum value of the cube value of the 90-degree-axis component and the average value of the sum value of the cube value of the 0-degree-axis component to obtain the direction angle of the prime wind energy.

4. The method according to claim 1, wherein the performing, by the wind turbine generator system, vector analysis of the obtained parameter of wind condition to obtain the direction angle of the prime wind energy during the predetermined length of time comprises:
    performing, by the wind turbine generator system, decomposition operation on a corresponding wind velocity value in a geographical coordinate system, respectively, to obtain a 90-degree-axis component and a 0-degree-axis component of the wind velocity value at each moment, based on the wind direction angle at each moment in the predetermined period of time;
    calculating, by the wind turbine generator system, a sum value of the 90-degree-axis component of the wind velocity value and a sum value of the 0-degree-axis component of the wind velocity value;
    calculating, by the wind turbine generator system, an average value of the sum value of the 90-degree-axis component of the wind velocity value and an average value of the sum value of the 0-degree-axis component of the wind velocity value, respectively, based on the sum values;
    calculating, by the wind turbine generator system, a cube value of the average value of the sum value of the 90-degree-axis component of the wind velocity value and a cube value of the average value of the sum value of the 0-degree-axis component of the wind velocity value, respectively, based on the average values; and performing, by the wind turbine generator system, vector composition operation based on the cube value of the average value of the sum value of the 90-degree-axis component and the cube value of the average value of the sum value of the 0-degree-axis component to obtain the direction angle of the prime wind energy.

5. The method according to claim 1, wherein the processing of controlling, by the wind turbine generator system, the yaw of a wind turbine generator system based on the direction angle of the prime wind energy comprises:
obtaining, by the wind turbine generator system, an azimuth angle of a cabin of the wind turbine generator system at present moment;
calculating, by the wind turbine generator system, a differential value between the direction angle of prime wind energy and the azimuth angle of the cabin; and
controlling, by the wind turbine generator system, the yaw of the wind turbine generator system based on the differential value.

6. The method according to claim 2, wherein the processing of controlling, by the wind turbine generator system, the yaw of a wind turbine generator system based on the direction angle of the prime wind energy comprises:
obtaining, by the wind turbine generator system, an azimuth angle of a cabin of the wind turbine generator system at present moment;
calculating, by the wind turbine generator system, a differential value between the direction angle of prime wind energy and the azimuth angle of the cabin; and
controlling, by the wind turbine generator system, the yaw of the wind turbine generator system based on the differential value.

7. The method according to claim 3, wherein the processing of controlling, by the wind turbine generator system, the yaw of a wind turbine generator system based on the direction angle of the prime wind energy comprises:
obtaining, by the wind turbine generator system, an azimuth angle of a cabin of the wind turbine generator system at present moment;
calculating, by the wind turbine generator system, a differential value between the direction angle of prime wind energy and the azimuth angle of the cabin; and
controlling, by the wind turbine generator system, the yaw of the wind turbine generator system based on the differential value.

8. The method according to claim 4, wherein the processing of controlling, by the wind turbine generator system, the yaw of a wind turbine generator system based on the direction angle of the prime wind energy comprises:
obtaining, by the wind turbine generator system, an azimuth angle of a cabin of the wind turbine generator system at present moment;
calculating, by the wind turbine generator system, a differential value between the direction angle of prime wind energy and the azimuth angle of the cabin; and
controlling, by the wind turbine generator system, the yaw of the wind turbine generator system based on the differential value.

9. A wind turbine generator system, comprising:
an acquiring device, configured to obtain a real-time parameter of wind condition according to a predetermined length of time, wherein the parameter of wind condition comprises a wind direction angle and a wind velocity;
a processor, configured to perform vector analysis of the obtained parameter of wind condition to obtain a direction angle of the prime wind energy during the predetermined length of time, wherein the direction angle of the prime wind energy is direction with the highest wind energy, and is obtained by performing vector analysis on a cube value of the wind velocity during the predetermined length of time; and
a controller, configured to control yaw of the wind turbine generator system according to the direction angle of the prime wind energy.

10. The wind turbine generator system according to claim 9, wherein the processor is configured to:
calculate a cube value of the wind velocity corresponding to each moment in the predetermined period of time;
perform vector decomposition operation on a corresponding cube value of the wind velocity, respectively, in a geographical coordinate system, based on the wind direction angle at each moment, to obtain a 90-degree-axis component and a 0-degree-axis component of the cube value of the wind velocity at each moment;
calculate a sum value of the 90-degree-axis component of the cube value of the wind velocity and a sum value of the 0-degree-axis component of the cube value of the wind velocity, respectively;
calculate an average value of the 90-degree-axis component of the cube value of the wind velocity and an average value of the 0-degree-axis component of the cube value of the wind velocity, respectively, based on the sum values; and
perform vector composition operation based on the average value of the sum value of the 90-degree-axis component and the average value of the sum value of the 0-degree-axis component to obtain the direction angle of the prime wind energy.

11. The wind turbine generator system according to claim 9, wherein the controller is configured to:
obtain an azimuth angle of a cabin of the wind turbine generator system at present moment;
calculate a differential value between the direction angle of prime wind energy and the azimuth angle of the cabin; and
control the yaw of the wind turbine generator system based on the differential value.

12. The wind turbine generator system according to claim 10, wherein the controller is configured to:
obtain an azimuth angle of a cabin of the wind turbine generator system at present moment;
calculate a differential value between the direction angle of prime wind energy and the azimuth angle of the cabin; and
control the yaw of the wind turbine generator system based on the differential value.

13. The wind turbine generator system according to claim 9, wherein the acquiring device is a wind measurement sensor or an anemometer and anemoscope.

14. A non-transitory computer-readable storage medium, comprising a computer program, that is readable by a computer, and causes the computer to perform the method for yaw control according to claim 1.

* * * * *